United States Patent
Agarwal et al.

(10) Patent No.: US 9,859,935 B1
(45) Date of Patent: Jan. 2, 2018

(54) HS-SCCH ORDER RECOVERY IN MULTI-SUBSCRIBER IDENTITY MODULE (SIM) WIRELESS COMMUNICATION DEVICES

(71) Applicant: QUALCOMM Incorporated, San Diego, CA (US)

(72) Inventors: Arun Agarwal, Hyderabad (IN); Ravi Kishore Paruchuru, Hyderabad (IN); Suresh Sanka, Hyderabad (IN); Mukesh Kumar, Hyderabad (IN); Kamalpreet Singh Padam, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/202,028

(22) Filed: Jul. 5, 2016

(51) Int. Cl.
| | |
|---|---|
| H04W 88/06 | (2009.01) |
| H04W 36/14 | (2009.01) |
| H04W 48/18 | (2009.01) |
| H04W 72/02 | (2009.01) |
| H04B 1/3816 | (2015.01) |
| H04W 24/08 | (2009.01) |
| H04W 8/08 | (2009.01) |
| H04W 60/00 | (2009.01) |
| H04W 76/02 | (2009.01) |

(Continued)

(52) U.S. Cl.
CPC ............ *H04B 1/3816* (2013.01); *H04W 8/08* (2013.01); *H04W 24/08* (2013.01); *H04W 36/36* (2013.01); *H04W 48/18* (2013.01); *H04W 60/005* (2013.01); *H04W 72/02* (2013.01); *H04W 76/025* (2013.01); *H04W 76/046* (2013.01); *H04W 88/06* (2013.01)

(58) Field of Classification Search
CPC ..... H04W 88/06; H04W 8/183; H04W 48/16; H04W 36/14; H04W 60/005; H04W 48/18; H04W 76/025; H04W 36/36; H04W 72/02; H04W 72/0453; H04W 76/026; H04W 88/02; H04W 76/046; H04W 24/08; H04W 8/08; H04B 1/3816
USPC ... 455/552.1, 437, 452.1, 434, 432.1, 435.1, 455/435.2, 435.3, 67.11
See application file for complete search history.

(56) References Cited

U.S. PATENT DOCUMENTS

| | | |
|---|---|---|
| 2013/0303181 A1 | 11/2013 | Rajurkar et al. |
| 2013/0337861 A1 | 12/2013 | Bhogaraju et al. |

(Continued)

FOREIGN PATENT DOCUMENTS

EP    2621124 A1    7/2013

OTHER PUBLICATIONS

International Search Report and Written Opinion—PCT/US2017/037750—ISA/EPO—Aug. 29, 2017.

*Primary Examiner* — Philip Sobutka
(74) *Attorney, Agent, or Firm* — Foley & Lardner LLP

(57) ABSTRACT

Examples described herein relate to managing communications on a first subscription and a second subscription of a multi-Subscriber Identity Module (SIM) wireless communication device via a Radio Frequency (RF) resource, including, but not limited to, tuning the RF resource away from the second subscription to the first subscription, detecting a network-set activation state of a secondary cell associated with the first subscription, and adjusting the activation state of the secondary cell based on the network-set activation state.

31 Claims, 8 Drawing Sheets

(51) Int. Cl.
*H04W 36/36* (2009.01)
*H04W 76/04* (2009.01)

(56) References Cited

U.S. PATENT DOCUMENTS

| | | | |
|---|---|---|---|
| 2015/0005018 A1* | 1/2015 | Klatt | H04W 88/06 455/458 |
| 2015/0257057 A1* | 9/2015 | Su | H04W 56/0015 370/329 |
| 2015/0257199 A1* | 9/2015 | Su | H04W 76/048 455/552.1 |
| 2016/0126996 A1* | 5/2016 | Jeong | H04W 60/005 455/558 |
| 2017/0048773 A1* | 2/2017 | Miao | H04W 8/183 |

* cited by examiner

HS-SCCH ORDER RECOVERY IN MULTI-SUBSCRIBER IDENTITY MODULE (SIM) WIRELESS COMMUNICATION DEVICES

BACKGROUND

A wireless communication device, such as a mobile phone device or a smart phone, may include two or more Subscriber Identity Modules (SIMs). Each SIM may correspond to at least one subscription via a Radio Access Technology (RAT). Such a wireless communication device may be a multi-SIM wireless communication device. In a Multi-SIM-Multi-Active (MSMA) wireless communication device, all SIMs may be active at the same time. In a Multi-SIM-Multi-Standby (MSMS) wireless communication device, if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

A network (e.g., a WCDMA network) can configure various carrier information with respect to a wireless communication device through Radio Resource Control (RRC) layer signaling. Carrier options such as activating or deactivating a secondary cell can be configured through Layer 1 (L1) signaling, also known as Physical Layer signaling. An activation/deactivation order (e.g., a High-Speed Shared Control Channel (HS-SCCH) order) can be used by the network to dynamically enable or disable the secondary cell based on resource needs of the wireless communication device and current radio resource status (e.g., congestion status) of the network. The HS-SCCH order mechanism can be implemented to configure the secondary cell settings on the wireless communication device more rapidly than RRC layer signaling, which spans over tens of milliseconds.

Typically, the network sends a HS-SCCH order to a wireless communication device for configuring the secondary cell settings. The wireless communication device will send an Acknowledgement signal (ACK) or Negative Acknowledgement signal (NACK) in uplink to the network to indicate status of the HS-SCCH order. If the network does not receive any response from the wireless communication device, the network will retransmit the HS-SCCH order. If the network fails to receive any response corresponding to the retransmission(s) from the wireless communication device, the network will trigger RRC-level signaling for activating or deactivating the secondary cell configurations. The HS-SCCH order decoding can be highly reliably, and probability of successful Layer 1 signaling procedure with respect to HS-SCCH can approximate 100%. Therefore, due to the high reliability at Layer 1, the network generally assumes successful completion of the HS-SCCH order after the transmission/retransmission(s), and proceeds with target configurations of the HS-SCCH order on the network-side, even with the wireless communication device engaged in Discontinuous Transmission (DTX).

On the other hand, a multi-SIM wireless communication device having two or more subscriptions employs tune-away mechanisms for sharing a common Radio Frequency (RF) resource. That is, the RF resource can be tuned away from a first subscription to a second subscription for activities of the second subscription while suspending any activities of the first subscription, creating a tune-away gap with respect to the first subscription. The transmission/retransmission(s) of the HS-SCCH order that collide (e.g., overlap in time) with a tune-away gap spanning 50 ms to 100 ms can be lost, resulting in Layer 1 procedure failure. That is, the wireless communication device is not informed of the target configurations contained in the HS-SCCH order due to the tune-away gap.

Accordingly, given that the network proceeds with the target configurations corresponding to the HS-SCCH order and that the wireless communication device fails to receive the HS-SCCH order, a mismatch or disconnect between the network and the wireless communication device can result for the downlink channel configuration, thus negatively impacting the High-Speed Dedicated Physical Control Channel (HS-DPCCH) encoding in uplink. The network, in turn, would fail to decode the HS-DPCCH properly, resulting in failure to acquire Channel Quality Indicator (CQI) from the wireless communication device. The CQI is a measurement of quality of a communication link between the wireless communication device and the network. The failure is caused by the fact that different Reed-Muller tables are used for encoding for a single CQI and dual CQI. When an inappropriate Reed-Muller table is used, incompatible codewords are employed.

Subsequently, the network may stop scheduling downlink data completely because the wireless communication device may continue to retransmit Protocol Data Units (PDUs) in uplink until Radio Link Control (RLC) resets given that ACK on the High-Speed Physical Downlink Shared Channel (HS-PDSCH) is not being received by the wireless communication device. The ACK for uplink PDUs is being mapped to HS-PDSCH. At any rate, the wireless communication device unnecessarily consumes a considerable amount of energy by remaining in the connected state without actually transmitting and/or receiving data. The low throughput can negatively impact user experience due to page connection timeouts, slow buffering of videos, and/or the like.

The network can also misinterpret the CQI report, treating a high CQI report as a low CQI report, vice versa. For instance, while the wireless communication device remains in a connected state, the network can reduce scheduling for the wireless communication device as the network treats a high CQI report as a low CQI report, thus drastically reducing throughput. On the other hand, the network scheduling high Transport Block Size (TBS) for the wireless communication device as the network treats a low CQI report as a high CQI report, thus causing continuous decoding failure and Radio Link (RL) failures as well as RLC resets. The decoding failures, RL failures, and RLC resets can negatively impact user experience.

SUMMARY

Examples described herein relate to apparatuses and methods for determining a network-set activation state of a secondary cell associated with a first subscription of a multi-Subscriber Identity Module (SIM) wireless communication device having the first subscription and a second subscription. The first subscription may be enabled by a first SIM. The second subscription may be enabled by a second SIM. The first subscription and the second subscription may share a Radio Frequency (RF) resource, for example, in a Multi-SIM-Multi-Standby (MSMS) wireless communication device. A first mobile network corresponding to the first subscription may send activation/deactivation orders (e.g., High-Speed Shared Control Channel (HS-SCCH) orders) to the wireless communication device for activating or deactivating the secondary cell (e.g., for configuring an activation state of the secondary cell). In some instances, while the RF resource is tuned away to the second subscription, activation/deactivation orders may be sent to the wireless communication device, resulting in reception or decoding failure with respect to the activation/deactivation orders.

In some examples, the wireless communication device may detect a network-set activation state of the secondary cell after the tune-away gap by continuously monitoring the HS-SCCH for scheduling information in response to determining that a length of the tune-away gap exceeds a certain threshold. The first mobile network sending scheduling information to the wireless communication device indicates that the activation state of the secondary cell (as known to the first mobile network) is dual-carrier activated. On the other hand, the first mobile network not sending scheduling information to the wireless communication device indicates that the activation state of the secondary cell (as known to the first mobile network) is dual-carrier deactivated. Dual carrier High-Speed Downlink Packet Access (HSDPA) allows a network to transmit HSDPA data from two cells to a wireless communication device simultaneously, resulting in doubled peak rate from 21 Mbps to 42 Mbps without the use of Multiple-Input Multiple-Output (MIMO) in WCDMA, release 8. The peak rate can reach 84.4 Mbps with the use of MIMO in WCDMA, release 9. Dual carrier HSDPA may also be referred to as dual cell HSDPA or DC-HSDPA. During a DC-HSDPA call setup, the serving cell and the secondary serving cell information is communicated to the wireless communication device. In addition, the common channels and traffic channels of the secondary serving cell are monitored by the wireless communication device. Once a DC-HSDPA connection is established, HS-SCCH orders may serve as a trigger to activate or de-activate the secondary serving cell. Also, either the serving cell or the secondary serving cell may de-activate the secondary serving cell.

A previous activation state refers to an activate state of the secondary cell set before the tune-away gap. The network-set activation state being different from the previous activation state indicates that a mismatch between the wireless communication device and first mobile network has occurred due to the tune-away gap. That is, the wireless communication device may have failed to receive an activation/deactivation order due to the tune-away gap. In response to detecting such mismatch, the wireless communication device may set the activation state to the network-set activation state, instead of remaining in the previous activation state.

According to some examples, a method for a wireless communication device having a first SIM associated with a first subscription and a second SIM associated with a second subscription to manage communications on the first subscription and the second subscription via a RF resource, the method including tuning the RF resource away from the second subscription to the first subscription. detecting a network-set activation state of a secondary cell associated with the first subscription, and adjusting the activation state of the secondary cell based on the network-set activation state.

In some examples, the method further includes tuning the RF resource away from the first subscription to the second subscription.

In some examples, the method further determining a length of a tune-away gap for which the RF resource is tuned away from the first subscription to the second subscription, determining whether the length of the tune-away gap exceeds a threshold, and detecting the network-set activation state of the secondary cell associated with the first subscription in response to determining that the length of the tune-away gap exceeds the threshold.

In some examples, the threshold is 48 ms.

In some examples, the method further includes determining a previous activation state of the secondary cell, wherein the previous activation state of the secondary cell is an activation state of the secondary cell before tuning the RF resource away from the first subscription to the second subscription.

In some examples, adjusting the activation state of the secondary cell based on the network-set activation state includes determining that the network-set activation state is different from the previous activation state and setting the activation state of the secondary cell as the network-set activation state in response to determining that the network-set activation state is different from the previous activation state.

In some examples, setting the activation state of the secondary cell as the network-set activation state in response to determining that the network-set activation state is different from the previous activation state includes designating the secondary cell to be in a dual-carrier deactivated state in response to determining that the previous activation state was a dual-carrier activated state and that the network-set activation state is a dual-carrier deactivated state.

In some examples, setting the activation state of the secondary cell as the network-set activation state in response to determining that the network-set activation state is different from the previous activation state includes designating the secondary cell to be in a dual-carrier activated state in response to determining that the previous activation state was a dual-carrier deactivated state and that the network-set activation state is a dual-carrier activated state.

In some examples, detecting the network-set activation state of the secondary cell associated with the first subscription includes determining whether the secondary cell is designated to be in a dual-carrier activated state or dual-carrier deactivated state.

In some examples, detecting the network-set activation state of the secondary cell includes monitoring whether data has been scheduled for the secondary cell, determining that the network-set activation state of the secondary cell is dual-carrier activated state in response to determining that data has been scheduled for the secondary cell, and determining that the network-set activation state of the secondary cell is dual-carrier deactivated state in response to determining that data has not been scheduled for the secondary cell.

In some examples, monitoring whether the data has been scheduled for the secondary cell includes monitoring a HS-SCCH for a monitoring duration.

In some examples, the monitoring duration is at least one of 50 System Frame Numbers (SFNs) or 100 ms.

In some examples, determining that the data has been scheduled for the secondary cell includes determining that the data has been scheduled for the HS-SCCH within the monitoring duration.

In some examples, determining that the data has not been scheduled for the secondary cell includes determining that the data has not been scheduled for the HS-SCCH within the monitoring duration.

According to various examples, the wireless communication device includes a RF resource, a processor configured to connect to a first SIM associated with a first subscription and to a second SIM associated with a second subscription, and configured to tune the RF resource away from the second subscription to the first subscription, detect a network-set activation state of a secondary cell associated with the first subscription, and adjust the activation state of the secondary cell based on the network-set activation state.

In some examples, the processor is further configured to tune the RF resource away from the first subscription to the second subscription.

In some examples, the processor is further configured to determine a length of a tune-away gap for which the RF resource is tuned away from the first subscription to the second subscription, determine whether the length of the tune-away gap exceeds a threshold, and detect the network-set activation state of the secondary cell associated with the first subscription in response to determining that the length of the tune-away gap exceeds the threshold.

In some examples, the threshold is 48 ms.

In some examples, the processor is further configured to determine a previous activation state of the secondary cell, wherein the previous activation state of the secondary cell is an activation state of the secondary cell before tuning the RF resource away from the first subscription to the second subscription.

In some examples, adjusting the activation state of the secondary cell based on the network-set activation state includes determining that the network-set activation state is different from the previous activation state, and setting the activation state of the secondary cell as the network-set activation state in response to determining that the network-set activation state is different from the previous activation state.

In some examples, setting the activation state of the secondary cell as the network-set activation state in response to determining that the network-set activation state is different from the previous activation state includes designating the secondary cell to be in a dual-carrier deactivated state in response to determining that the previous activation state was a dual-carrier activated state and that the network-set activation state is a dual-carrier deactivated state.

In some examples, setting the activation state of the secondary cell as the network-set activation state in response to determining that the network-set activation state is different from the previous activation state includes designating the secondary cell to be in a dual-carrier activated state in response to determining that the previous activation state was a dual-carrier deactivated state and that the network-set activation state is a dual-carrier activated state.

In some examples, the processor detects the network-set activation state of the secondary cell associated with the first subscription by determining whether the secondary cell is designated to be in a dual-carrier activated state or dual-carrier deactivated state.

In some examples, the processor detects the network-set activation state of the secondary cell by monitoring whether data has been scheduled for the secondary cell, determining that the network-set activation state of the secondary cell is dual-carrier activated state in response to determining that data has been scheduled for the secondary cell, and determining that the network-set activation state of the secondary cell is dual-carrier deactivated state in response to determining that data has not been scheduled for the secondary cell.

In some examples, the processor monitors whether the data has been scheduled for the secondary cell by monitoring a HS-SCCH for a monitoring duration.

In some examples, the monitoring duration is at least one of 50 SFNs or 100 ms.

In some examples, the processor determines that the data has been scheduled for the secondary cell by determining that the data has been scheduled for the HS-SCCH within the monitoring duration.

In some examples, the processor determines that the data has not been scheduled for the secondary cell by determining that the data has not been scheduled for the HS-SCCH within the monitoring duration.

According to various examples, a non-transitory computer-readable medium having processor-readable instructions such that, when executed, causes a processor to perform a method for managing communications on a first subscription and a second subscription via a RF resource, the method including tuning the RF resource away from the second subscription to the first subscription, detecting a network-set activation state of a secondary cell associated with the first subscription, and adjusting the activation state of the secondary cell based on the network-set activation state.

In some examples, the wireless communication device includes means for tuning the RF resource away from the second subscription to the first subscription, means for detecting a network-set activation state of a secondary cell associated with the first subscription, and means for adjusting the activation state of the secondary cell based on the network-set activation state.

BRIEF DESCRIPTION OF THE DRAWINGS

The accompanying drawings, which are incorporated herein and constitute part of this specification, illustrate exemplary examples of the disclosure, and together with the general description given above and the detailed description given below, serve to explain the features of the various examples.

DETAILED DESCRIPTION

Figure 1:
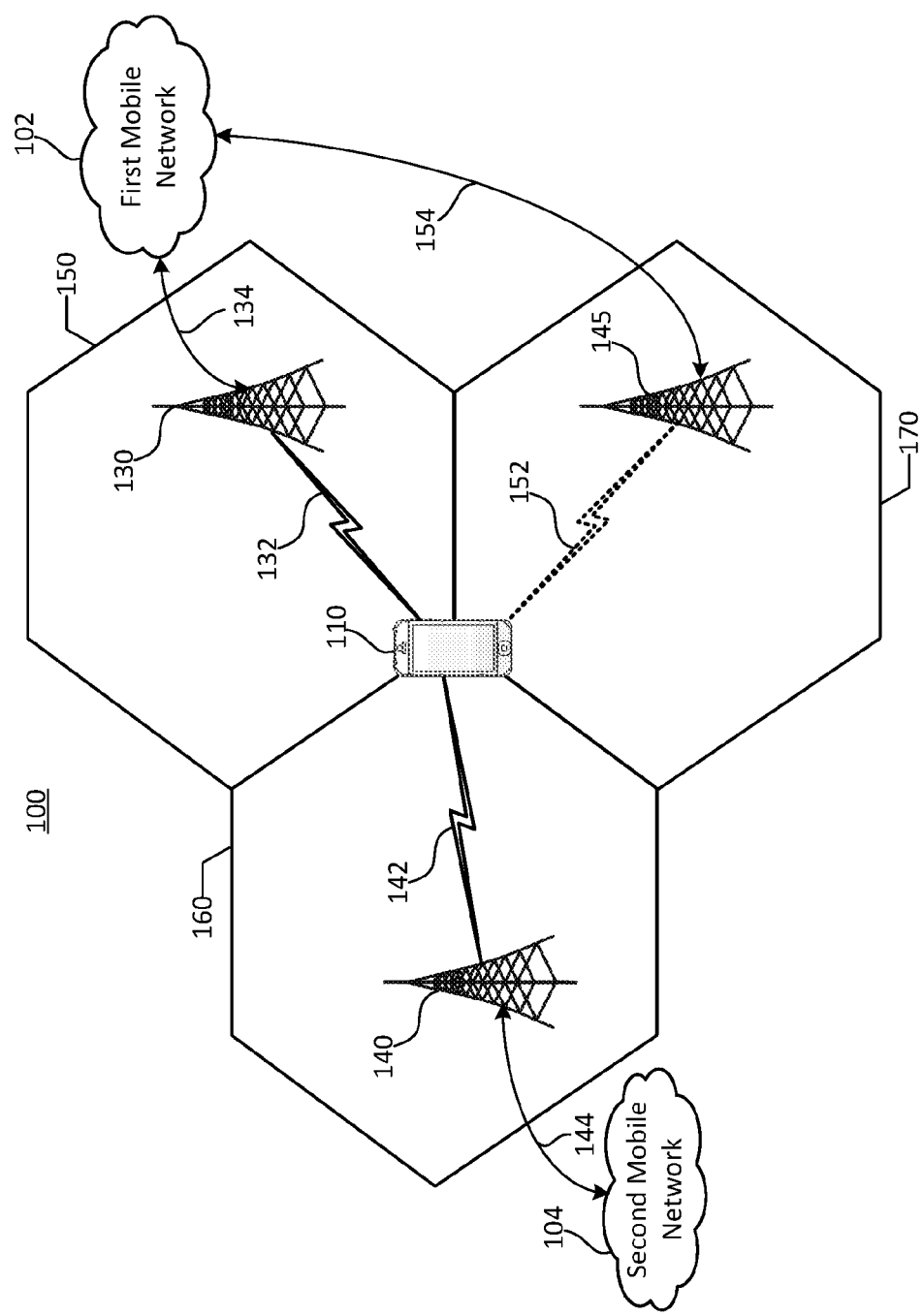
FIG. 1 is a schematic diagram of a communication system in accordance with various examples.

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some modern communication devices, referred to herein as a wireless communication device, User Equipment (UE), or Mobile Station (MS), may include any one or all of cellular telephones, smart phones, personal or mobile multimedia players, personal data assistants, laptop computers, personal computers, tablet computers, smart books, palmtop computers, wireless electronic mail receivers, multimedia Internet-enabled cellular telephones, wireless gaming controllers, and similar personal electronic devices. Such a wireless communication device may include at least one Subscriber Identity Module (SIM), a programmable processor, memory, and circuitry for connecting to two or more mobile communication networks.

A wireless communication device may include one or more SIMs that provide users of the wireless communication devices with access to one or multiple separate mobile communication networks. The mobile communication networks may be supported by Radio Access Technologies (RATs). The wireless communication device may be configured to connect to one or more base stations via one or more RATs. Examples of RATs may include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), Global System for Mobile Communications (GSM), Code Division Multiple Access 1x Radio Transmission Technology (1x), General Packet Radio Service (GPRS), Wi-Fi, Personal Communications Service (PCS), and other protocols that may be used in a wireless communications network or a data communications network. Each RAT may be associated with a subscription or SIM.

A wireless communication device provided with a plurality of SIMs and connected to two or more subscriptions or networks with one subscription or network being active at a given time is a Multi-SIM-Multi-Standby (MSMS) communication device. In one example, the MSMS communication device may be a Dual-SIM-Dual-Standby (DSDS) communication device, which may include two SIMs that may both be active on standby, but one is deactivated when the other one is in use. In another example, the MSMS communication device may be a Triple-SIM-Triple-Standby (TSTS) communication device, which includes three SIMs that may all be active on standby, where two may be deactivated when the third one is in use. In other examples, the MSMS communication device may be other suitable multi-SIM communication devices, with, for example, four or more SIMs, such that when one is in use, the others may be deactivated.

On the other hand, a wireless communication device that includes a plurality of SIMs and connects to two or more subscriptions or networks with two or more subscriptions or networks being active at a given time may be a MSMA communication device. An example MSMA communication device may be a Dual-SIM-Dual-Active (DSDA) communication device, which may include two SIM. Both SIMs may remain active. In another example, the MSMA device may be a Triple-SIM-Triple-Active (TSTA) communication device, which may include three SIM. All three SIMs may remain active. In other examples, the MSMA communication device may be other suitable multi-SIM communication devices with four or more SIMs, all of which may be active.

Generally, examples described herein may be applicable to a wireless communication device having a shared Radio Frequency (RF) resource and/or a MSMS wireless communication device having at least a first SIM and a second SIM. Illustrating with a non-limiting example, the first SIM may be associated with a first subscription via a first RAT, and the second SIM may be associated with a second subscription via a second RAT. The examples may also be applicable to a MSMA wireless communication device that suspends first subscription communication activities due to blanking pattern, power back-off, interference, and/or the like when the second subscription receives pages or other types of communications, vice versa.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless device on a network and enable communication services with the network. Because the information stored in a SIM may be the wireless device to establish a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM as the SIM and the communication network, as well as the services and RATs supported by that network, correlate to one another.

Various examples may be implemented within a communication system 100, an example of which is illustrated in FIG. 1. Referring to FIG. 1, a first mobile network 102 and second mobile network 104 may each associate with a plurality of cellular base stations. For instance, a first base station 130 and a third base station 145 may be associated with the first mobile network 102. A second base station 140 may be associated with the second mobile network 104. The first base station 130 may broadcast the first mobile network 102 in a first serving cell 150. The third base station 145 may broadcast the first mobile network 102 in a secondary cell 170. The second base station 140 may broadcast the second mobile network 104 in a second serving cell 160.

A wireless communication device 110 may be associated with (within effective boundaries of) the first serving cell 150, second serving cell 160, and secondary cell 170. Communications between the wireless communication device 110 and the secondary cell 170 can be configured (e.g., activated or deactivated) using activation/deactivation orders, such as, but not limited to, Speed Shared Control Channel (HS-SCCH) orders. For instance, the first mobile network 102 can dynamically activate or deactivate usage of the secondary cell 170 with respect to the wireless communication device 110 by sending the HS-SCCH orders containing configurations of the usage of the secondary cell 170 to the wireless communication device 110.

The first base station 130 may be in communication with the first mobile network 102 over a wired or wireless connection 134. The second base station 140 may be in communication with the second mobile network 104 over a wired or wireless connection 144. The third base station 145 may be in communication with the first mobile network 102 over a wired or wireless connection 154.

The wireless communication device 110 may be in communication with the first mobile network 102 through a first cellular connection 132 to the first base station 130. The first cellular connection 132 may correspond to the first RAT on a first subscription (first SIM) of the wireless communication device 110. The wireless communication device 110 may be in communication with the second mobile network 104 through a second cellular connection 142 to the second base station 140. The second cellular connection 142 may correspond to the second RAT of the wireless communication device 110. When activated, a third cellular connection 152 may be established between the wireless communication device 110 and the third base station 145 for accessing the first mobile network 102. The third cellular connection 152 may correspond to a third RAT of the wireless communication device 110 on the first subscription.

The operator of the first mobile network 102 may provide the secondary cell 170 for an additional point of communication, as in the dual carrier High Speed Downlink Packet Access (HSDPA) scenario. That is, the wireless communication device 110 can communicate with the first mobile network 102 through both the first serving cell 150 and the secondary cell 170 for improved throughput.

The first cellular connection 132, second cellular connection 142, and third cellular connection 152 may each be made through two-way wireless communication links. Examples of each of the first RAT, second RAT, and third RAT may include, but not limited to, FDMA, TDMA, CDMA (e.g., EVDO), UMTS (e.g., TDS, WCDMA, LTE, eMBMS, HSDPA, or the like), GSM, 1×, GPRS, Wi-Fi, PCS, and/or another protocol used in a wireless communications network or a data communications network. By way of illustrating with a non-limiting example, the first RAT (employed by the cellular connection 132) and the third RAT may each be WCDMA, LTE, or another suitable RAT. In some examples, the first RAT may be the same as the third RAT. In other examples, the first RAT may be different from the third RAT. The second RAT (employed by the second cellular connection 142) may be LTE or another suitable RAT.

Each of the first base station 130, the second base station 140, and third base station 145 may include at least one antenna group or transmission station located in the same or different areas. The at least one antenna group or transmission station may be associated with signal transmission and reception. Each base station 130, 140, or 145 may include one or more processors, modulators, multiplexers, demodulators, demultiplexers, antennas, and the like for performing the functions described herein. In some examples, each base station 130, 140, or 145 may be an access point, Node B, evolved Node B (eNodeB or eNB), base transceiver station (BTS), or the like.

In various examples, the wireless communication device 110 may be configured to access the first mobile network 102 and the second mobile network 104 by virtue of the multi-SIM and/or the multi-mode SIM configuration of the wireless communication device 110. When a SIM corresponding to a RAT is inserted, the wireless communication device 110 may access the mobile communication network associated with that RAT based on the information stored on the SIM through registrations and call setups.

In some examples, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some examples, the wireless communication device 110 may establish a wireless connection with a wireless access point (not shown), such as over a Wi-Fi connection. The wireless access point may be configured to connect to the Internet or another network over a wired connection.

Figure 2:
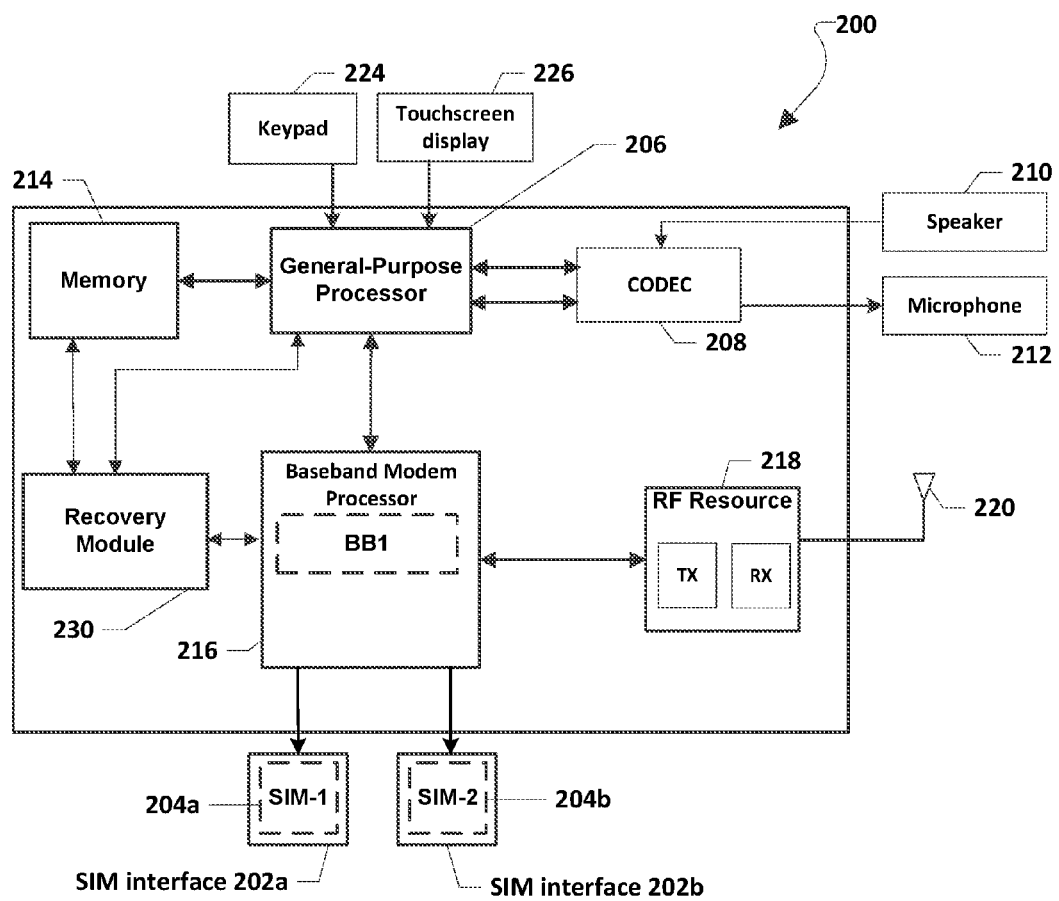
FIG. 2 is a component block diagram of a wireless communication device according to various examples.

FIG. 2 is a functional block diagram of a wireless communication device 200 suitable for implementing various examples. According to various examples, the wireless communication device 200 may be the wireless communication device 110 as described with reference to FIG. 1. Referring to FIGS. 1-2, the wireless communication device 200 may include a first SIM interface 202a, which may receive a first identity module SIM-1 204a (the first SIM) that is associated with the first mobile network 102. The wireless communication device 200 may also include a second SIM interface 202b, which may receive a second identity module SIM-2 204b (the second SIM) that is associated with the second mobile network 104.

A SIM (e.g., SIM-1 204a, SIM-2 204b, and/or the like) in various examples may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various examples may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home Public Land Mobile Network (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may be a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIMs (e.g., the SIM-1 204a, the SIM-2 204b, and/or the like) in the wireless communication device 200 may be associated with at least one baseband-RF resource chain. A baseband-RF resource chain may include the baseband modem processor 216, which may perform baseband/modem functions for communications on the SIMs. The baseband modem processor 216 may include one or more amplifiers and radios, referred to generally herein as a RF resource 218 or RF chain.

The examples described herein may be applicable to wireless communication devices in which the SIMs 204a and 204b share a common set of RF resource (particularly, the RF resource 218). Alternatively, examples described herein may be applicable to wireless communication devices in which each of the SIMs 204a and 204b has a separate RF resource, but activities of one of the SIMs 204a and 204b may be deactivated while the other one of the SIMs 204a and 204b is active. The examples can be applied to a single-SIM wireless communication device that fails to receive or decode activation/deactivation order from the first mobile network 102 due to interference, decoding failure, or the like, instead of due to a tune-away gap.

The RF resource 218 may include at least one transceiver that perform transmit/receive functions for the associated SIMs 204a and 204b of the wireless communication device 200. The RF resource 218 may include separate transmit and receive circuitry, or may include a transceiver that combines transmitter and receiver functions. The RF resource 218 may be coupled to a wireless antenna 220. The RF resource 218 may also be coupled to the baseband modem processor 216.

In some examples, the general-purpose processor 206, the memory 214, the baseband modem processor 216, and the RF resource 218 may be included in the wireless communication device 200 as a system-on-chip. In some examples, the SIMs 204a and 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include a recovery module 230. The recovery module 230 may recover activation/deactivation orders lost due to a tune-away gap from the first mobile network 102 by determining a network-set activation state of the secondary cell 170 after the tune-away gap. For instance, the recovery module 230 may configure the RF resource 218 to monitor a HS-SCCH channel for scheduling information concerning scheduling data over the secondary cell 170. The recovery module 230 may set the activation state with respect to the secondary cell 170 to dual-carrier activated state or dual-carrier deactivated state, based on whether the network-set activation state matches a previous activation state.

In some examples, the recovery module 230 may be implemented within the general-purpose processor 206. For example, the recovery module 230 may be implemented as a software application stored within the memory 214 and executed by the general-purpose processor 206. Accordingly, such examples can be implemented with minimal additional hardware costs. However, other examples relate to systems and processes implemented with dedicated hardware specifically configured for performing operations described herein with respect to the recovery module 230. For example, the recovery module 230 may be implemented as a separate processing component (i.e., separate from the general-purpose processor 206). The recovery module 230 may be coupled to the memory 214, the general processor 206, the baseband processor 216, and/or the RF resource 218 for performing the function described herein.

Hardware and/or software for the functions may be incorporated in the wireless communication device 200 during manufacturing, for example, as a part of a configuration of an original equipment manufacturer (OEM) of the wireless communication device 200. In further examples, such hardware and/or software may be added to the wireless communication device 200 post-manufacture, such as by installing one or more hardware devices and/or software applications onto the wireless communication device 200.

In some examples, the wireless communication device 200 may include, among other things, additional SIM cards, SIM interfaces, at least another RF resource associated with the additional SIM cards, and additional antennas for connecting to additional mobile networks.

Figure 3:
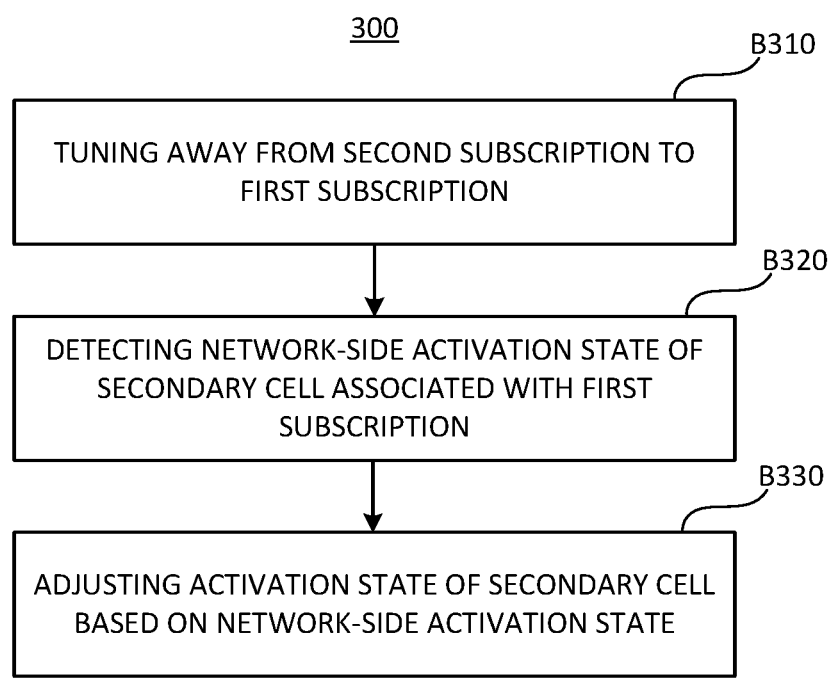
FIG. 3 is a process flowchart diagram illustrating a secondary cell configuration recovery method according to various examples.

FIG. 3 is a process flowchart diagram illustrating an example of a secondary cell configuration recovery method 300 according to various examples. Referring to FIGS. 1-3, in some examples, the secondary cell configuration recovery method 300 may be performed by the recovery module 230 and/or the general-purpose processor 206 of the wireless communication device 200. The RF resource 218 may be tuned away from the first subscription to the second subscription, initiating a tune-away gap. An activation state of the secondary cell 170 may refer to whether the first subscription is in a dual-carrier activated state (e.g., the secondary cell 170 is used) or a dual-carrier deactivated state (e.g., the secondary cell 170 is not used). The activation state of the secondary cell 170 set when (or before) the tune-away gap starts may be referred to as a previous activation state. The first subscription may be enabled by the first SIM (SIM-1 204*a*). The second subscription may be enabled by the second SIM (SIM-2 204*b*).

At block B310, the recovery module 230 and/or the general-purpose processor 206 may tune the RF resource 218 away from the second subscription back to the first subscription, ending the tune-away gap. Transmissions or retransmissions of an activation/deactivation order from the first mobile network 102 over the first subscription may overlap with a portion of the tune-away gap, and may thus be lost.

Figure 3A:
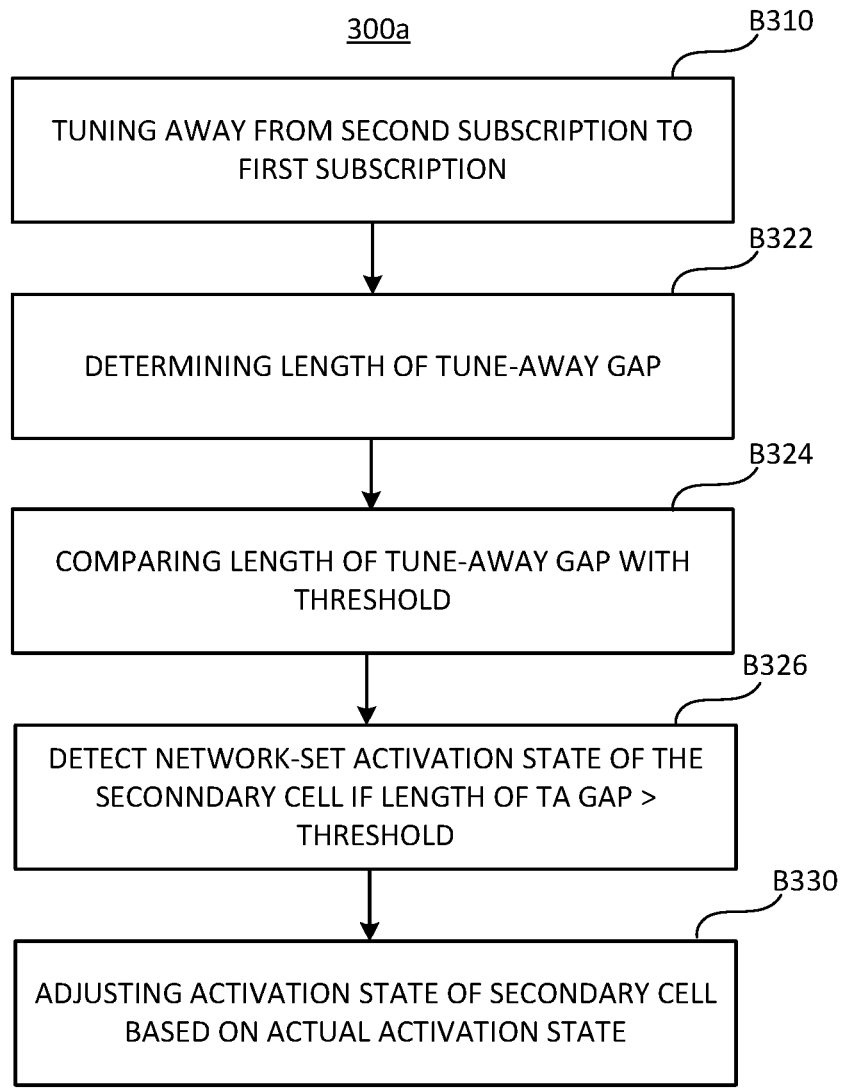
FIG. 3A is a process flowchart diagram illustrating a secondary cell configuration recovery method according to one example in which the length of the tune-away gap may be compared to a threshold and in response to determining that the length of the tune-away gap exceeds the threshold, and the network-set activation state of the secondary cell may be detected.

The recovery module 230 and/or the general-purpose processor 206 may detect a network-set activation state of the secondary cell 170 associated with the first subscription, at block B320. In one example shown in FIG. 3A, the recovery module 230 and/or the general-purpose processor 206 may determine a length of the tune-away gap at block B322. The length of the tune-away gap may be compared to a threshold, at block B324. In response to determining that the length of the tune-away gap exceeds the threshold, the recovery module 230 and/or the general-purpose processor 206 may detect the network-set activation state of the secondary cell 170 at block B326. The network-set activation state refers to the activation state of the secondary cell 170 with respect to the wireless communication device 200 as configured by the first mobile network 102 after the tune-away gap. In some cases, the network-set activation state may be the same as the previous activation state because no HS-SCCH order has been transmitted/retransmitted by the first mobile network 102 during the tune-away gap. In other cases, the network-set activation state may be different from the previous activation state because a HS-SCCH order has been transmitted/retransmitted by the first mobile network 102 during the tune-away gap and the first mobile network 102 proceeds with the target configuration (e.g., the network-set activation state) when the wireless communication device 200 has not received the HS-SCCH order and therefore does not have knowledge of the target configuration.

In some examples, detecting the network-set activation state of the secondary cell 170 may include monitoring whether the secondary cell 170 has been scheduled by monitoring the HS-SCCH for a monitoring duration. In response to determining that the HS-SCCH has been scheduled, the network-set activation state may be the dual-carrier activated state. On the other hand, in response to determining that the HS-SCCH has not been scheduled, the network-set activation state may be the dual-carrier deactivated state.

At block B330, the recovery module 230 and/or the general-purpose processor 206 may adjust the activation state of the secondary cell 170 based on the network-set activation state detected at block B320. In some examples, such adjustments may include determining whether the network-set activation state of the secondary cell 170 is different from the previous activation state. In response to determining that the network-set activation state and the previous activation state are different, the recovery module 230 and/or the general-purpose processor 206 may set the network-set activation state as the activation state of the secondary cell 170.

Figure 4:
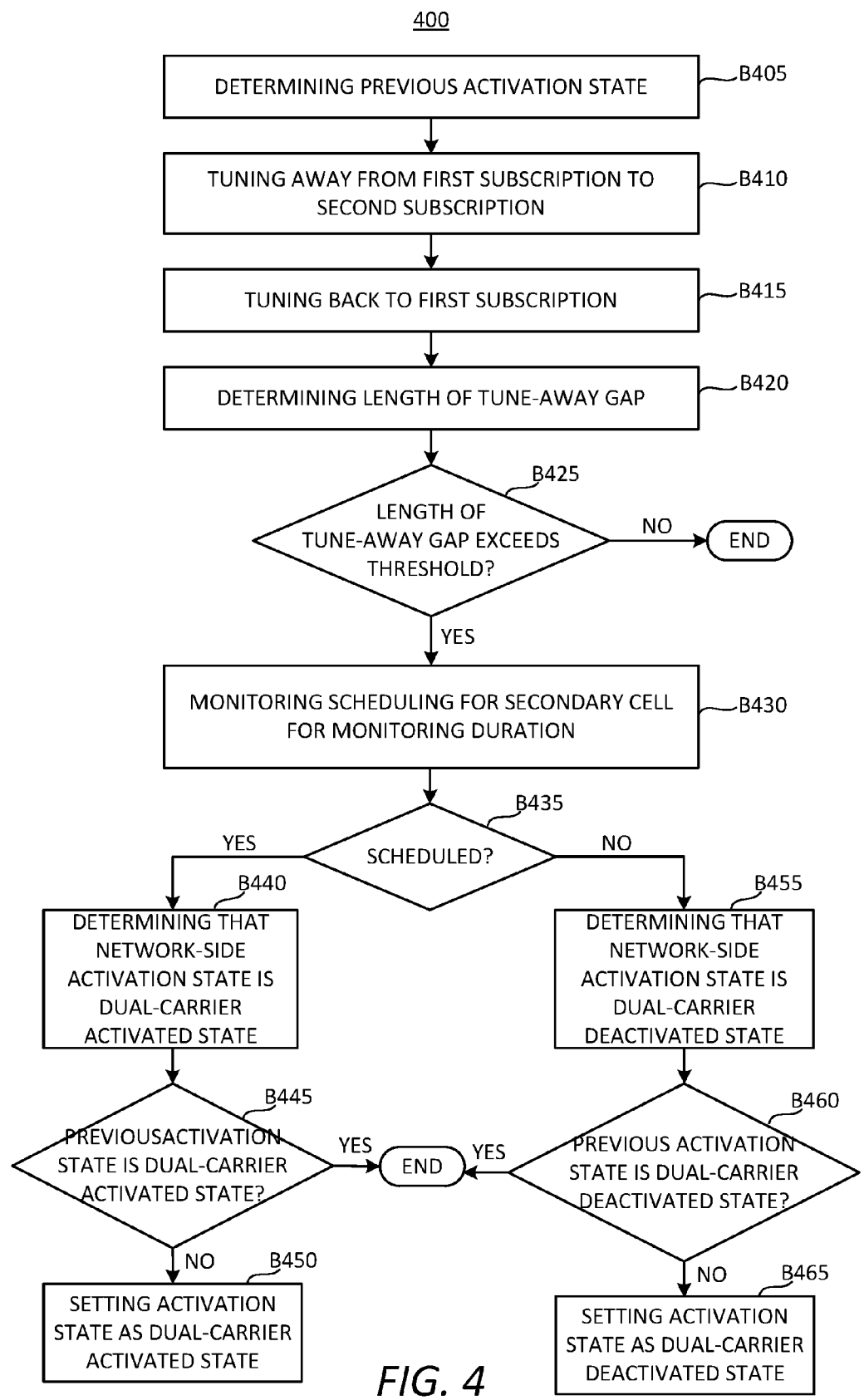
FIG. 4 is a process flowchart diagram illustrating a secondary cell configuration recovery method according to various examples.
Figure 5:
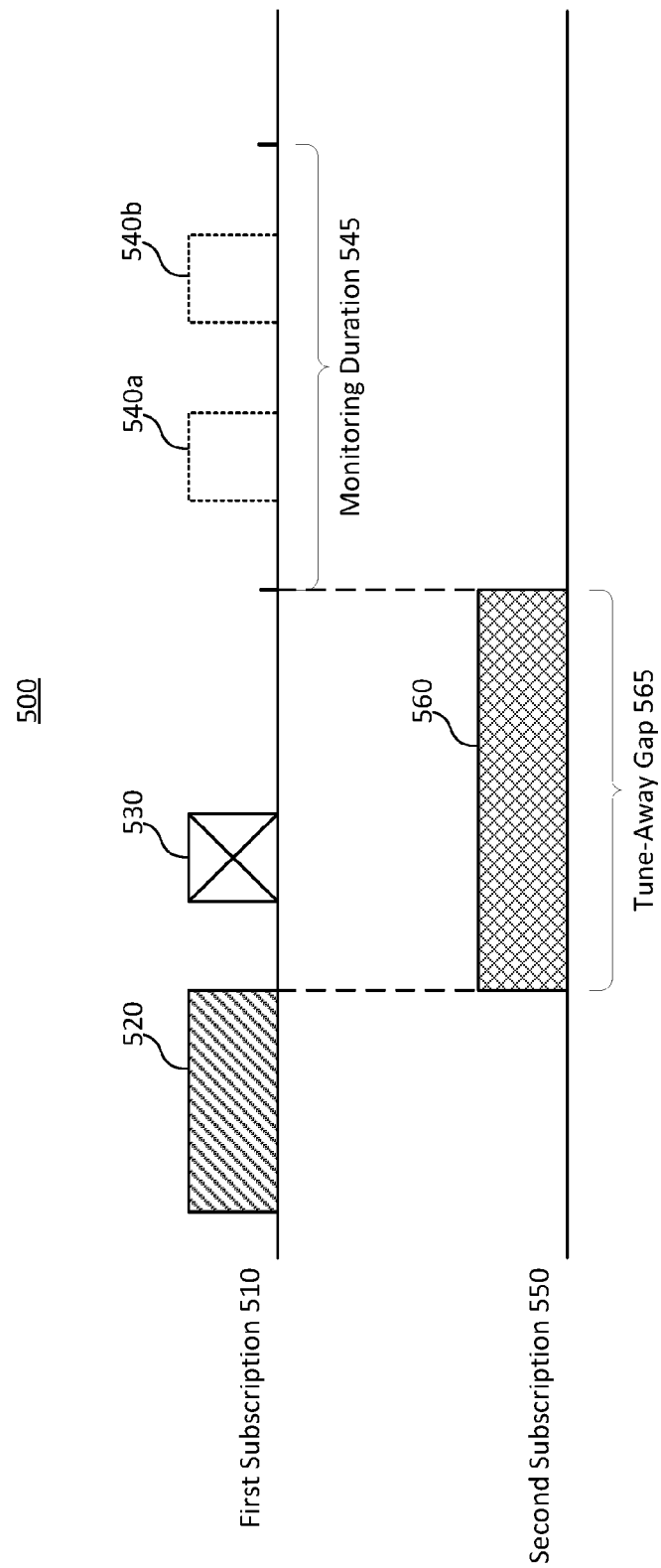
FIG. 5 is a schematic diagram illustrating the secondary cell configuration recovery method according to some examples.

FIG. 4 is a process flowchart diagram illustrating an example of a secondary cell configuration recovery method 400 according to various examples. FIG. 5 is a schematic diagram 500 illustrating an example of the secondary cell configuration recovery method 400 according to some examples. Referring to FIGS. 1-5, one or more of blocks B405-B465 may correspond to one of blocks B310-B330. The secondary cell configuration recovery method 400 may be performed by the recovery module 230 and/or the general-purpose processor 206 of the wireless communication device 200. A first subscription 510 may be enabled by SIM-1 204*a*. A second subscription 550 may be enabled by SIM-2 204*b*. The diagram 500 illustrates usage of the RF resource 218 by the first subscription 510 and the second subscription 550. Activities 520, 530, 540*a*, and/or 540*b* of the first subscription 510 may be provided by the first serving cell 150, or both the first serving cell 150 and secondary cell 170, depending on the activation state with respect to the secondary cell 170.

At block B405, the recovery module 230 and/or the general-purpose processor 206 may determine the previous activation state. The previous activation state may refer to the activation state by which communications on the first subscription 510 is handled before a tune-away gap 565 is started. Illustrating with a non-limiting example, the previous activation state may be the activation state by which the activities 520 are communicated to the first mobile network 102. The activities 520 may include a call, page monitoring, active data transfer, and/or the like.

At block B410, the recovery module 230 and/or the general-purpose processor 206 may tune the RF resource 218 away from the first subscription 510 to the second subscription 550, for the tune-away gap 565. The RF resource 218 may be tuned for second-subscription activities 560, such as, but not limited to, a call, page monitoring, active data transfer, and/or the like. While the RF resource 218 is tuned to the second subscription 550, communications on the first subscription 510 may not be received. Therefore, the wireless communication device 200 may fail to receive and fail to decode any HS-SCCH order 530 originating from the first mobile network 102 that collides (overlaps in time with) the tune-away gap 565.

At block B415, the recovery module 230 and/or the general-purpose processor 206 may tune the RF resource 218 back from the second subscription 550 to the first subscription 510, ending the tune-away gap 565. At block B420, the recovery module 230 and/or the general-purpose processor 206 may determine the length of the tune-away gap 565. For instance, as tuning away to the second subscription 550 occurs, the recovery module 230 and/or the general-purpose processor 206 may initiate a timer, which ends when the tune-away gap 565 ends.

At block B425, the recovery module 230 and/or the general-purpose processor 206 may determine whether the length of the tune-away gap 565 exceeds a threshold. The length of the tune-away gap 565 exceeding the threshold indicates a high probability that the transmissions and retransmissions of the HS-SCCH order 530 collides with the tune-away gap 565. The HS-SCCH order 530 may typically include a plurality of instances (e.g., 4 transmission/retransmissions total). Illustrating with a non-limiting example, the threshold may be 48 ms. Illustrating with other non-limiting examples, the threshold may be 25 ms, 50 ms, 75 ms, 100 ms, 200 ms, 25 to 200 ms, or the like.

In some examples, the threshold may vary based on the network conditions of the first cellular connection 132 and third cellular connection 152, the need of the wireless communication device 200, a combination thereof, and/or the like. Illustrating with a non-limiting example, whereas the previous activation state is the dual-carrier deactivated state, the threshold may decrease as the network conditions with respect to the first cellular connection 132 deteriorates, vice versa. Illustrating with another non-limiting example, whereas the previous activation state is the dual-carrier activated state, the threshold may increase as the network conditions with respect to the first cellular connection 132 deteriorates, vice versa. Illustrating with yet another non-limiting example, whereas the previous activation state is the dual-carrier deactivated state, the threshold may increase as the network conditions with respect to the third cellular connection 152 deteriorates, vice versa. Illustrating with yet another non-limiting example, whereas the previous activation state is the dual-carrier activated state, the threshold may decrease as the network conditions with respect to the third cellular connection 152 deteriorates, vice versa. Illustrating with yet another non-limiting example, whereas the previous activation state is the dual-carrier deactivated state, the threshold may decrease as a need for throughput by the wireless communication device 200 increases, vice versa. Illustrating with yet another non-limiting example, whereas the previous activation state is the dual-carrier activated state, the threshold may increase or remain the same as a need for throughput by the wireless communication device 200 increases, vice versa. One or more factors discussed herein may be evaluated individually or as a weighted combination.

In response to determining that the length of the tune-away gap 565 does not exceed the threshold (B425:NO), the method 400 ends. On the other hand, in response to determining that the length of the tune-away gap 565 exceeds the threshold (B425:YES), the recovery module 230 and/or the general-purpose processor 206 may monitor for a monitoring duration 545 whether the secondary cell 170 has been scheduled, at block B430. For instance, the recovery module 230 and/or the general-purpose processor 206 may configure the RF resource 218 to monitor the HS-SCCH on both carriers of the first subscription 510 while in the previous activation state for any scheduling blocks such as, but not limited to blocks 540*a* and 540*b*. in some examples, the monitoring on both carriers (e.g., the first serving cell 150 and secondary cell 160) occurs regardless of the previous activation state. In other words, even when the wireless communication device 200 is set to be in the dual-carrier deactivated state after the turn-away gap 565, the HS-SCCH on both carriers may be monitored.

Illustrating with a non-limiting example, the monitoring duration 545 may be 50 System Frame Numbers (SFNs). Illustrating with another non-limiting example, the monitoring duration 545 may be 100 ms. Other examples of the monitoring duration 545 may include, but not limited to, 35 SFNs, 75 SFNs, 100 SFNs, 35 to 100 SFNs, 80 ms, 120 ms, 150 ms, 35 to 150 ms, or the like.

The recovery module 230 and/or the general-purpose processor 206 may determine whether the secondary cell 170 has been scheduled via the HS-SCCH (e.g., whether any scheduling block such as blocks 540*a* or 540*b* have been received) during the monitoring duration 545, at block B435. In response to determining that secondary cell 170 has been scheduled (B435:YES), the recovery module 230 and/or the general-purpose processor 206 may determine that the network-set activation state is the dual-carrier activated state, at block B440. At block B445, the recovery module 230 and/or the general-purpose processor 206 may determine whether the previous activation state determined at block B405 is the same as the network-set activation state (the dual-carrier activated state).

In response to determining that the previous activation state is the same as the network-set activation state (the dual-carrier activated state) (B445:YES), the method 400 ends. On the other hand, in response to determining that the previous activation state is not the same as the network-set activation state (the dual-carrier activated state) (B445:NO), the recovery module 230 and/or the general-purpose processor 206 may set the activation state with respect to the secondary cell 170 as the dual-carrier activated state, at block B450.

On the other hand, in response to determining that secondary cell 170 has not been scheduled with the monitoring duration 545 (B435:NO), the recovery module 230 and/or the general-purpose processor 206 may determine that the network-set activation state is the dual-carrier deactivated state, at block B455. At block B460, the recovery module 230 and/or the general-purpose processor 206 may determine whether the previous activation state determined at block B405 is the same as the network-set activation state (the dual-carrier deactivated state).

In response to determining that the previous activation state is the same as the network-set activation state (the dual-carrier deactivated state) (B460:YES), the method 400 ends. On the other hand, in response to determining that the previous activation state is not the same as the network-set activation state (the dual-carrier deactivated state) (B460:NO), the recovery module 230 and/or the general-purpose processor 206 may set the activation state with respect to the secondary cell 170 as the dual-carrier deactivated state, at block B465.

Figure 6:
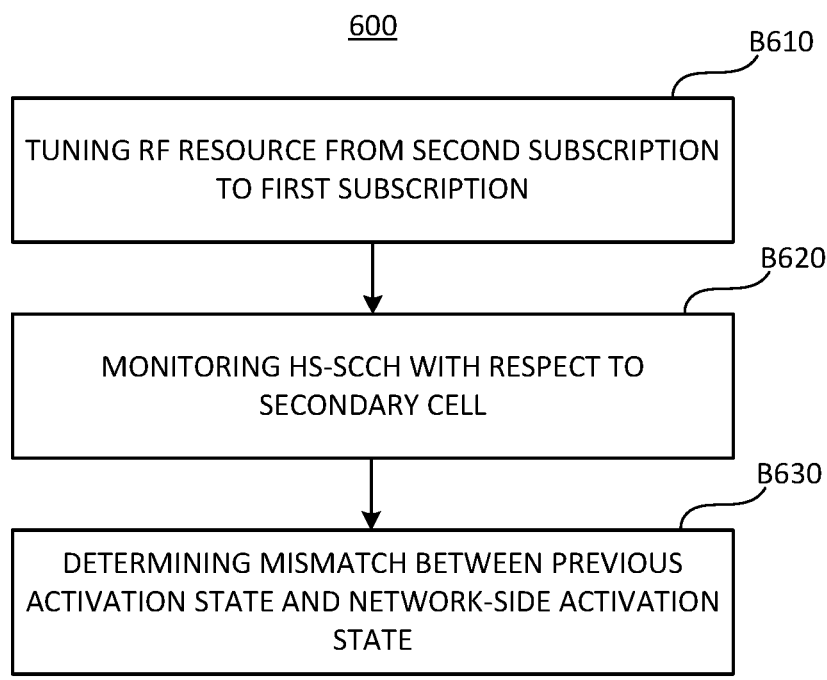
FIG. 6 is a process flowchart diagram illustrating a secondary cell configuration recovery method according to various examples.

FIG. 6 is a process flowchart diagram illustrating an example of a secondary cell configuration recovery method 600 according to various examples. Referring to FIGS. 1-6, one or more of blocks B610-B630 may correspond to one or more of blocks B310-B330 and/or one or more of blocks B405-B465. The secondary cell configuration recovery method 600 may be performed by the recovery module 230 and/or the general-purpose processor 206 of the wireless communication device 200.

In some examples, the recovery module 230 and/or the general-purpose processor 206 may tune the RF resource 218 from the second subscription 550 back to the first subscription 510 after the tune-away gap 565 ends, at block B610. At block B620, the recovery module 230 and/or the general-purpose processor 206 may monitor the HS-SCCH with respect to the secondary cell 170 for scheduling. At block B630, the recovery module 230 and/or the general-purpose processor 206 may determine a mismatch between the previous activation state and the network-set activation state, for example, based on whether the secondary cell 170 has been scheduled.

Figure 7:
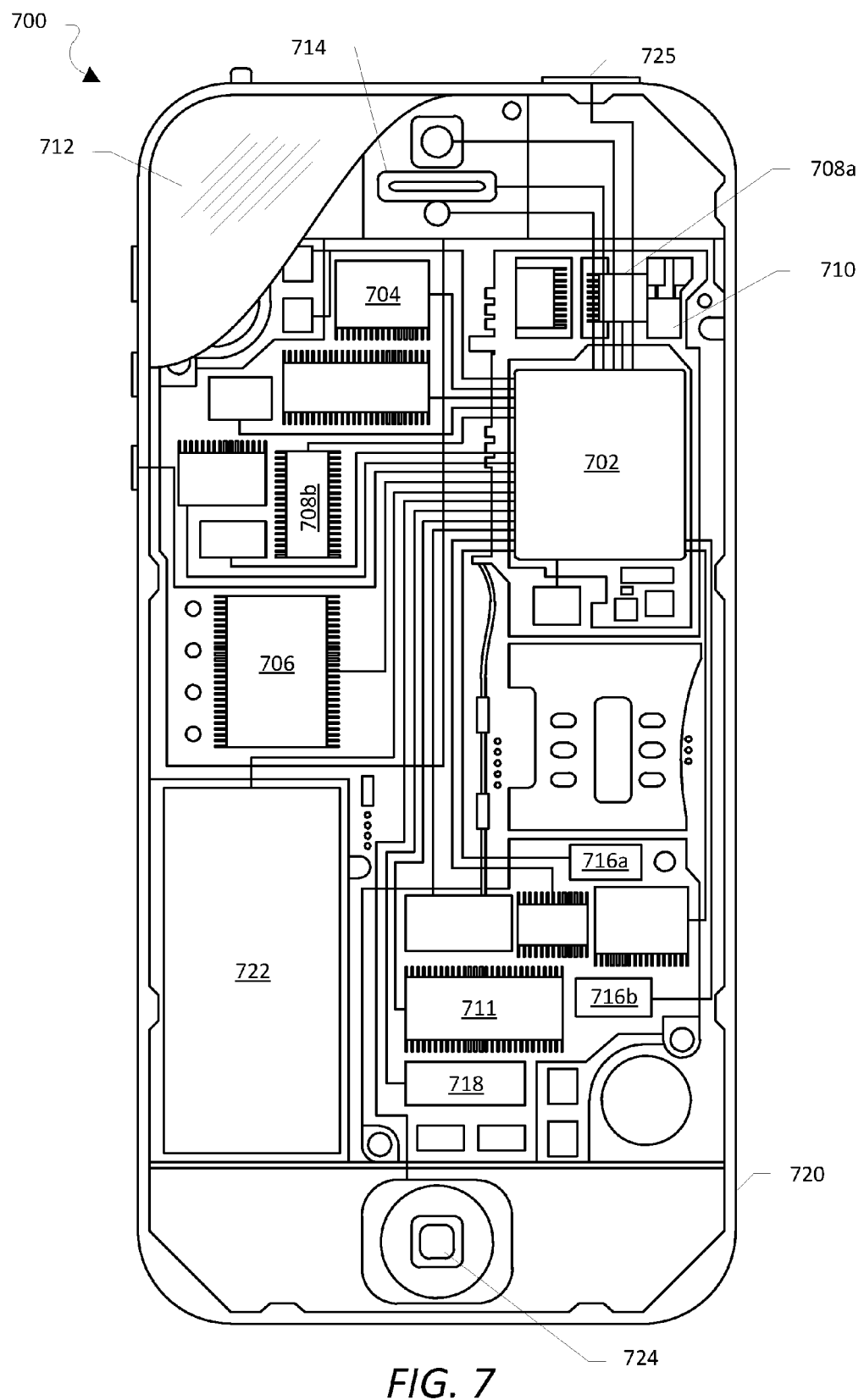
FIG. 7 is a component block diagram of a wireless communication device suitable for use with various examples.

The various examples may be implemented in any of a variety of wireless communication devices 110 and 200, an example of which is illustrated in FIG. 7, as wireless communication device 700. As such, the wireless communication device 700 may implement the process and/or the apparatus of FIGS. 1-6, as described herein.

With reference to FIGS. 1-7, the wireless communication device 700 may include a processor 702 coupled to a touchscreen controller 704 and an internal memory 706. The processor 702 may be one or more multi-core integrated circuits designated for general or specific processing tasks.

The memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the wireless communication device 700 need not have touch screen capability.

The wireless communication device 700 may have one or more cellular network transceivers 708a, 708b coupled to the processor 702 and to at least one antenna 710 and configured for sending and receiving cellular communications. The transceivers 708a, 708b and antenna 710 may be used with the above-mentioned circuitry to implement the various example methods. The cellular network transceivers 708a, 708b may be the RF resource 218. The antenna 710 may be the antenna 220. The wireless communication device 700 may include two or more SIM cards 716a, 716b, corresponding to SIM-1 204a (the first SIM) and SIM-2 204b (the second SIM), coupled to the transceivers 708a, 708b and/or the processor 702. The wireless communication device 700 may include a cellular network wireless modem chip 711 (e.g., the baseband modem processor 216) that enables communication via at least one cellular network and is coupled to the processor 702.

The wireless communication device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not shown).

The wireless communication device 700 may also include speakers 714 for providing audio outputs. The wireless communication device 700 may also include a housing 720, constructed of a plastic, metal, or a combination of materials, for containing all or some of the components discussed herein. The wireless communication device 700 may include a power source 722 coupled to the processor 702, such as a disposable or rechargeable battery. The rechargeable battery may also be coupled to a peripheral device connection port (not shown) to receive a charging current from a source external to the wireless communication device 700. The wireless communication device 700 may also include a physical button 724 for receiving user inputs. The wireless communication device 700 may also include a power button 726 for turning the wireless communication device 700 on and off.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present examples.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present examples. Various modifications to these examples will be readily apparent to those skilled in the art, and the generic principles defined herein may be applied to some examples without departing from the spirit or scope of the examples. Thus, the present examples are not intended to be limited to the examples shown herein but is to be accorded the widest scope consistent with the following claims and the principles and novel features disclosed herein.

What is claimed is:

1. A method for a wireless communication device having a first Subscriber Identity Module (SIM) associated with a first subscription and a second SIM associated with a second subscription to manage communications on the first subscription and the second subscription via a Radio Frequency (RF) resource, the method comprising:
    tuning the RF resource away from the second subscription to the first subscription;
    detecting a network-set activation state of a secondary cell associated with the first subscription; and
    adjusting a secondary cell activation state of the wireless communication device based on the network-set activation state.

2. The method of claim 1, further comprising tuning the RF resource away from the first subscription to the second subscription.

3. The method of claim 2, further comprising:
    determining a length of a tune-away gap for which the RF resource is tuned away from the first subscription to the second subscription;
    determining whether the length of the tune-away gap exceeds a threshold; and
    detecting the network-set activation state of the secondary cell associated with the first subscription in response to determining that the length of the tune-away gap exceeds the threshold.

4. The method of claim 3, wherein the threshold is 48 ms.

5. The method of claim 2, further comprising determining a previous secondary cell activation state of the wireless communication device, wherein the previous secondary cell activation state is a secondary cell activation state of the wireless communication device before tuning the RF resource away from the first subscription to the second subscription.

6. The method of claim 5, wherein adjusting the secondary cell activation state of the wireless communication device based on the network-set activation state comprises:
    determining that the network-set activation state is different from the previous secondary cell activation state; and
    setting the secondary cell activation state of the wireless communication device as the network-set activation state in response to determining that the network-set activation state is different from the previous secondary cell activation state.

7. The method of claim 6, wherein setting the secondary cell activation state of the wireless communication device as the network-set activation state in response to determining that the network-set activation state is different from the previous secondary cell activation state comprises designating the secondary cell to be in a dual-carrier deactivated state in response to determining that the previous secondary cell activation state was a dual-carrier activated state and that the network-set activation state is a dual-carrier deactivated state.

8. The method of claim 6, wherein setting the secondary cell activation state of the wireless communication device as the network-set activation state in response to determining that the network-set activation state is different from the previous secondary cell activation state comprises designating the secondary cell to be in a dual-carrier activated state in response to determining that the previous secondary cell activation state was a dual-carrier deactivated state and that the network-set activation state is a dual-carrier activated state.

9. The method of claim 1, wherein detecting the network-set activation state of the secondary cell associated with the first subscription comprises determining whether the secondary cell is designated to be in a dual-carrier activated state or dual-carrier deactivated state.

10. The method of claim 1, wherein detecting the network-set activation state of the secondary cell comprises:
    monitoring whether data has been scheduled for the secondary cell;
    determining that the network-set activation state of the secondary cell is dual-carrier activated state in response to determining that data has been scheduled for the secondary cell; and
    determining that the network-set activation state of the secondary cell is dual-carrier deactivated state in response to determining that data has not been scheduled for the secondary cell.

11. The method of claim 10, wherein monitoring whether the data has been scheduled for the secondary cell comprises monitoring a High-Speed Shared Control Channel (HS-SCCH) for a monitoring duration.

12. The method of claim 11, wherein the monitoring duration is at least one of 50 System Frame Numbers (SFNs) or 100 ms.

13. The method of claim 11, wherein determining that the data has been scheduled for the secondary cell comprises determining that the data has been scheduled for the HS-SCCH within the monitoring duration.

14. The method of claim 11, wherein determining that the data has not been scheduled for the secondary cell comprises determining that the data has not been scheduled for the HS-SCCH within the monitoring duration.

15. The method of claim 1, wherein the network-set activation state of the secondary cell is a dual-carrier network-set activation state of the secondary cell.

16. A wireless communication device, comprising:
    a Radio Frequency (RF) resource;
    a processor configured to connect to a first Subscriber Identity Module (SIM) associated with a first subscription and to a second SIM associated with a second subscription, and configured to:
        tune the RF resource away from the second subscription to the first subscription;
        detect a network-set activation state of a secondary cell associated with the first subscription; and
        adjust a secondary cell activation state of the wireless communication device based on the network-set activation state; and
    a memory.

17. The wireless communication device of claim 16, wherein the processor is further configured to tune the RF resource away from the first subscription to the second subscription.

18. The wireless communication device of claim 17, wherein the processor is further configured to:
- determine a length of a tune-away gap for which the RF resource is tuned away from the first subscription to the second subscription;
- determine whether the length of the tune-away gap exceeds a threshold; and
- detect the network-set activation state of the secondary cell associated with the first subscription in response to determining that the length of the tune-away gap exceeds the threshold.

19. The wireless communication device of claim 18, wherein the threshold is 48 ms.

20. The wireless communication device of claim 17, wherein the processor is further configured to determine a previous secondary cell activation state of the wireless communication device, wherein the previous secondary cell activation state is a secondary cell activation state of the wireless communication device before tuning the RF resource away from the first subscription to the second subscription.

21. The wireless communication device of claim 20, wherein adjusting the secondary cell activation state of the wireless communication device based on the network-set activation state comprises:
- determining that the network-set activation state is different from the previous secondary cell activation state; and
- setting the secondary cell activation state of the wireless communication device as the network-set activation state in response to determining that the network-set activation state is different from the previous secondary cell activation state.

22. The wireless communication device of claim 21, wherein setting the secondary cell activation state of the wireless communication device as the network-set activation state in response to determining that the network-set activation state is different from the previous secondary cell activation state comprises designating the secondary cell to be in a dual-carrier deactivated state in response to determining that the previous secondary cell activation state was a dual-carrier activated state and that the network-set activation state is a dual-carrier deactivated state.

23. The wireless communication device of claim 21, wherein setting the secondary cell activation state of the wireless communication device as the network-set activation state in response to determining that the network-set activation state is different from the previous secondary cell activation state comprises designating the secondary cell to be in a dual-carrier activated state in response to determining that the previous secondary cell activation state was a dual-carrier deactivated state and that the network-set activation state is a dual-carrier activated state.

24. The wireless communication device of claim 16, wherein the processor detects the network-set activation state of the secondary cell associated with the first subscription by determining whether the secondary cell is designated to be in a dual-carrier activated state or dual-carrier deactivated state.

25. The wireless communication device of claim 16, wherein the processor detects the network-set activation state of the secondary cell by:
- monitoring whether data has been scheduled for the secondary cell;
- determining that the network-set activation state of the secondary cell is dual-carrier activated state in response to determining that data has been scheduled for the secondary cell; and
- determining that the network-set activation state of the secondary cell is dual-carrier deactivated state in response to determining that data has not been scheduled for the secondary cell.

26. The wireless communication device of claim 25, wherein the processor monitors whether the data has been scheduled for the secondary cell by monitoring a High-Speed Shared Control Channel (HS-SCCH) for a monitoring duration.

27. The wireless communication device of claim 26, wherein the monitoring duration is at least one of 50 System Frame Numbers (SFNs) or 100 ms.

28. The wireless communication device of claim 26, wherein the processor determines that the data has been scheduled for the secondary cell by determining that the data has been scheduled for the HS-SCCH within the monitoring duration.

29. The wireless communication device of claim 26, wherein the processor determines that the data has not been scheduled for the secondary cell by determining that the data has not been scheduled for the HS-SCCH within the monitoring duration.

30. A non-transitory computer-readable medium having processor-readable instructions such that, when executed, causes a processor to perform a method for managing communications on a first subscription and a second subscription via a Radio Frequency (RF) resource, the method comprising:
- tuning the RF resource away from the second subscription to the first subscription;
- detecting a network-set activation state of a secondary cell associated with the first subscription; and
- adjusting a secondary cell activation state of the wireless communication device based on the network-set activation state.

31. A wireless communication device, comprising:
- means for tuning the RF resource away from the second subscription to the first subscription;
- means for detecting a network-set activation state of a secondary cell associated with the first subscription; and
- means for adjusting a secondary cell activation state of the wireless communication device based on the network-set activation state.

* * * * *